(12) United States Patent
Nakashima et al.

(10) Patent No.: US 8,903,555 B2
(45) Date of Patent: *Dec. 2, 2014

(54) CONTROL SYSTEM OF WIND POWER GENERATOR, WIND FARM, AND METHOD FOR CONTROLLING WIND POWER GENERATOR

(75) Inventors: Takumi Nakashima, Tokyo (JP); Masayuki Hashimoto, Tokyo (JP); Akira Yasugi, Tokyo (JP); Tsuyoshi Wakasa, Tokyo (JP); Hisanobu Shinoda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,134

(22) Filed: Mar. 14, 2012

(65) Prior Publication Data

US 2012/0261919 A1    Oct. 18, 2012

Related U.S. Application Data

(63) Continuation of application No. 13/017,375, filed on Jan. 31, 2011, now abandoned, which is a continuation (Continued)

(51) Int. Cl.
*G05B 21/00* (2006.01)
*G01M 1/38* (2006.01)

(Continued)

(52) U.S. Cl.
CPC .............. *F03D 7/048* (2013.01); *F03D 7/0284* (2013.01); *F05B 2270/337* (2013.01); *Y02E 10/723* (2013.01)
USPC ............. 700/278; 700/291; 700/297; 290/44; 290/45; 322/20; 322/28; 322/29

(58) Field of Classification Search
USPC ......... 700/287, 291, 297; 290/44, 55; 322/20, 322/28, 29
See application file for complete search history.

(56) References Cited

U.S. PATENT DOCUMENTS 7,372,173 B2    5/2008    Lutze et al.
7,528,496 B2    5/2009    Fortmann
(Continued)

FOREIGN PATENT DOCUMENTS

JP    2005-42603 A     2/2005
JP    2009-303355 A    12/2009
(Continued)

OTHER PUBLICATIONS

International Search Report and Written Opinion of corresponding application PCT/JP2010/069336 mailed Nov. 22, 2010.

(Continued)

*Primary Examiner* — Mohammad Ali
*Assistant Examiner* — Ziaul Karim
(74) *Attorney, Agent, or Firm* — Manabu Kanesaka; Benjamin J. Hauptman

(57) ABSTRACT

A wind power generator generates power through a rotation of a rotor and is interconnected, and operated with its power generation output previously limited in order to be able to further supply the power to a power system in response to a decrease in system frequency. Thus, a concentrated control system derives a required restricted amount corresponding to a power generation output required to respond to the decrease in system frequency, derives a value by subtracting an amount corresponding to a latent power generation output with which the power generation output can be increased, from the required restricted amount, and sets a restricted amount of the power generation output in each wind power generator to perform the operation with the power generation output previously limited to respond to the decrease in system frequency, based on the above value.

4 Claims, 10 Drawing Sheets

Related U.S. Application Data of application No. PCT/JP2010/069336, filed on Oct. 29, 2010.

(60) Provisional application No. 61/409,250, filed on Nov. 2, 2010.

(51) Int. Cl.

| | | |
|---|---|---|
| *G05B 13/00* | (2006.01) | |
| *G05B 15/00* | (2006.01) | |
| *G05D 23/00* | (2006.01) | |
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *F03D 9/00* | (2006.01) | |
| *H02P 9/04* | (2006.01) | |
| *F03D 7/02* | (2006.01) | |
| *F03D 7/04* | (2006.01) | |

(56) References Cited

U.S. PATENT DOCUMENTS

| | | | | |
|---|---|---|---|---|
| 7,531,911 | B2 | 5/2009 | Rivas et al. | |
| 7,750,490 | B2 | 7/2010 | Scholte-Wassink | |
| 7,805,222 | B2 | 9/2010 | Jurkat | |
| 7,830,029 | B2 * | 11/2010 | Wobben | 290/44 |
| 7,898,099 | B2 * | 3/2011 | Stiesdal | 290/44 |
| 7,952,215 | B2 | 5/2011 | Hayashi et al. | |
| 8,041,466 | B2 | 10/2011 | Helle et al. | |
| 8,046,110 | B2 | 10/2011 | Mayor et al. | |
| 8,249,756 | B2 * | 8/2012 | Boss et al. | 700/293 |
| 8,301,311 | B2 * | 10/2012 | Nelson | 700/287 |
| 8,301,313 | B2 * | 10/2012 | Wobben | 700/297 |
| 8,378,643 | B2 * | 2/2013 | Arinaga et al. | 322/29 |
| 2005/0012339 | A1 * | 1/2005 | Mikhail et al. | 290/44 |
| 2006/0273595 | A1 | 12/2006 | Avagliano et al. | |
| 2007/0085343 | A1 * | 4/2007 | Fortmann | 290/44 |
| 2009/0055030 | A1 | 2/2009 | Mayor et al. | |
| 2010/0078940 | A1 * | 4/2010 | Kondo et al. | 290/44 |
| 2010/0127495 | A1 | 5/2010 | Egedal et al. | |
| 2010/0286835 | A1 | 11/2010 | Nyborg et al. | |
| 2011/0057445 | A1 * | 3/2011 | Acedo Sanchez et al. | 290/44 |
| 2011/0153099 | A1 | 6/2011 | Garcia | |
| 2011/0172837 | A1 * | 7/2011 | Forbes, Jr. | 700/291 |
| 2012/0104756 | A1 * | 5/2012 | Beekmann et al. | 290/44 |
| 2012/0139241 | A1 * | 6/2012 | Haj-Maharsi et al. | 290/44 |
| 2012/0139247 | A1 * | 6/2012 | Krueger | 290/44 |
| 2012/0245753 | A1 * | 9/2012 | Forbes, Jr. | 700/295 |

FOREIGN PATENT DOCUMENTS

| | | |
|---|---|---|
| JP | 2010-84545 A | 4/2010 |
| JP | 2010-127283 A | 6/2010 |
| KR | 20090083371 A | 8/2009 |

OTHER PUBLICATIONS

Korean Decision to Grant Patent, dated Feb. 14, 2012.

* cited by examiner

CONTROL SYSTEM OF WIND POWER GENERATOR, WIND FARM, AND METHOD FOR CONTROLLING WIND POWER GENERATOR

CROSS-REFERENCE TO RELATED APPLICATIONS

This application is a continuation application of U.S. patent application Ser. No. 13/017,375, filed Jan. 31, 2011, which is a continuation application of PCT/JP2010/069336 filed on Oct. 29, 2010 and claims the benefit of U.S. Provisional Application No. 61/409,250, filed on Nov. 2, 2010, the contents of which are hereby incorporated by their reference.

BACKGROUND OF THE INVENTION

1. Field of the Invention

The present invention relates to a control system of a wind power generator, a wind farm, and a method for controlling the wind power generator.

2. Description of Related Art

Recently, a power generation device interconnected to a system is required to contribute to prevention of fluctuation in frequency (PFR: Primary Frequency Response) in a power system within a predetermined time (such as 30 seconds) after disturbance is generated in the power system (hereinafter, referred to as the "frequency response control").

The frequency response control includes responses to an increase in frequency and a decrease in frequency of the power system. The increase in frequency of the power system is managed by limiting a power generation output of the wind power generator, and the decrease in frequency of the power system is managed by increasing the power generation output of the wind power generator.

A method for increasing the power generation output of the wind power generator includes a method to temporarily increase the power generation output of the wind power generator by converting inertial energy (referred to as inertia occasionally) possessed by a rotor of the wind power generator (hereinafter, referred to as the "inertial control"), and a method to supply power from an additional component such as a secondary battery, to the power system.

However, the above methods have the following problems. As for the inertia control, since the inertial energy of the rotor is lost, a rotation speed of the rotor decreases and a relationship between the rotation speed and wind speed drops out of optimal control, so that while the frequency of the power system is decreasing, a power generation amount (provided by multiplying a power generation output by time) is reduced as compared with that in normal optimal control. Therefore, although a peak of the frequency decrease of the power system can be reduced by performing the inertia control, the problem is that the power generation output of the wind power generator is low as compared with an optimal output, which causes an increase in frequency decreasing time of the power system. Further, as for the power supply from the additional component, the problem is that cost increases because the additional component is provided.

In addition, other than the above two methods, as shown in US2010/0127495A1, there is a method to generate power while previously limiting the power generation output on an optimal (maximum) output of the wind power generator with respect to wind speed, and increase the power generation output of the wind power generator to the optimal output at the time of a decrease in frequency of the power system (hereinafter, referred to as the "deload operation").

Thus, as for the frequency decrease in the power system, it is considered effective to operate the wind power generator in the deload operation and increase the power generation output of the wind power generator to the optimal output at the time of a frequency decrease because it is not necessary to provide the additional component, and power can be stably supplied to the power system in which the frequency decreases. However, the deload operation has the problem that a yearly power generation amount decreases in the wind power generator.

BRIEF SUMMARY OF THE INVENTION

The present invention was made in view of the above circumstances, and it is an object to provide a control system of a wind power generator, a wind farm, and a method for controlling the wind power generator, in which a restricted amount of a power generation output can be small even when the wind power generator performs an operation with the power generation output limited.

In order to solve the above problem, the following means are employed in the control system of the wind power generator, the wind farm, and the method for controlling the wind power generator according to the present invention.

That is, the control system of the wind power generator according to the present invention is interconnected to a system to generate power through a rotation of a rotor, and operated with its power generation output previously limited in order to be able to further supply the power to a power system in response to a decrease in frequency caused in the power system, and the control system includes first deriving means for deriving a required restricted amount corresponding to a power generation output required to respond to the decrease in frequency of the power system, second deriving means for deriving a value by subtracting an amount corresponding to a latent power generation output that the power generation output can be increased with, from the required restricted amount derived by the first deriving means, and setting means for setting a restricted amount of the power generation output to perform the operation with the power generation output previously limited, to respond to the decrease in frequency of the power system, based on the value derived by the second deriving means.

According to the present invention, the wind power generator generates the power through the rotation of the rotor and is interconnected to a system, and the wind power generator is operated with its power generation output previously limited in order to be able to further supply the power to the power system in response to the decrease in frequency caused in the power system.

In addition, in the case where the operation is performed with the power generation output previously limited, there is a case where the power generation output from a power generator is directly limited, and a case where the power generation output is optimized by closing a pitch angle of a blade in the rotor to allow wind energy to escape.

Thus, the first deriving means derives the required restricted amount corresponding to the power generation output required to respond to the decrease in frequency of the power system, and the second deriving means derives the value by subtracting the amount corresponding to the latent power generation output with which the power generation output can be increased, from the required restricted amount.

That is, the value derived by the second deriving means is the value provided by deducting the latent power generation output from the required restricted amount.

In addition, based on the value derived by the second deriving means, the setting means sets the restricted amount of the power generation output to perform the operation with the power generation output previously limited, to respond to the decrease in frequency of the power system.

As described above, according to the present invention, since the restricted amount of the power generation output is set based on the value provided by subtracting the amount corresponding to the latent power generation output with which the power generation output can be increased, from the require restricted amount, the restricted amount of the power generation output can be small even when the wind power generator performs the operation with the power generation output limited.

Further, in the control system according to the present invention, the latent power generation output includes at least one of a power generation output obtained from inertial energy possessed by the rotating rotor, a power generation output obtained from an overload operation performed at a rated output, and a power generation output used for charging an electric storage device.

According to the present invention, the restricted amount of the power generation output can be easily and surely reduced by using at least one of the power generation output obtained from the inertial energy possessed by the rotating rotor, the power generation output obtained from the overload operation performed at the rated output, and the power generation output used for charging the electric storage device.

In addition, in the control system of the wind power generator according to the present invention, the setting means may set the value derived by the second deriving means as the restricted amount of the power generation output in a case where a rotation speed of the rotor does not reach a rated rotation speed.

According to the present invention, since the value derived by the second deriving means is preferentially set for the wind power generator in which the rotation speed of the rotor does not reach the rated rotation speed, the restricted amount is large in the power generation output in the wind power generator in which the rotation speed of the rotor does not reach the rated rotation speed, so that the rotation speed of the rotor can more quickly reach the rated rotation speed.

In addition, a wind farm of the wind power generator according to the present invention includes a plurality of wind power generators, and the above-described control system.

According to the present invention, since the restricted amount of the power generation output can be set by the above control system with respect to each wind power generator, the restricted amount of the power generation output can be small even when the wind power generator performs the operation with the power generation output limited.

In addition, the method for controlling the wind power generator according to the present invention is a method for controlling a wind power generator which is interconnected to a system to generate power through a rotation of a rotor, and operated with its power generation output previously limited in order to be able to further supply the power to a power system in response to a decrease in frequency caused in the power system, and the method includes a first step of deriving a required restricted amount corresponding to a power generation output required to respond to the decrease in frequency of the power system, a second step of deriving a value by subtracting an amount corresponding to a latent power generation output that the power generation output can be increased with, from the required restricted amount derived in the first step, and a third step of setting a restricted amount of the power generation output to perform the operation with the power generation output previously limited, to respond to the decrease in frequency of the power system, based on the value derived in the second step.

According to the present invention, since the restricted amount of the power generation output is set based on the value provided by subtracting the amount corresponding to the latent power generation output with which the power generation output can be increased, from the require restricted amount, the restricted amount of the power generation output can be small even when the wind power generator performs the operation with the power generation output limited.

The present invention has an excellent effect of reducing the restricted amount of the power generation output even when the wind power generator performs the operation with the power generation output limited.

DETAILED DESCRIPTION OF THE INVENTION

Hereinafter, an embodiment of the present invention will be described.

Figure 1:
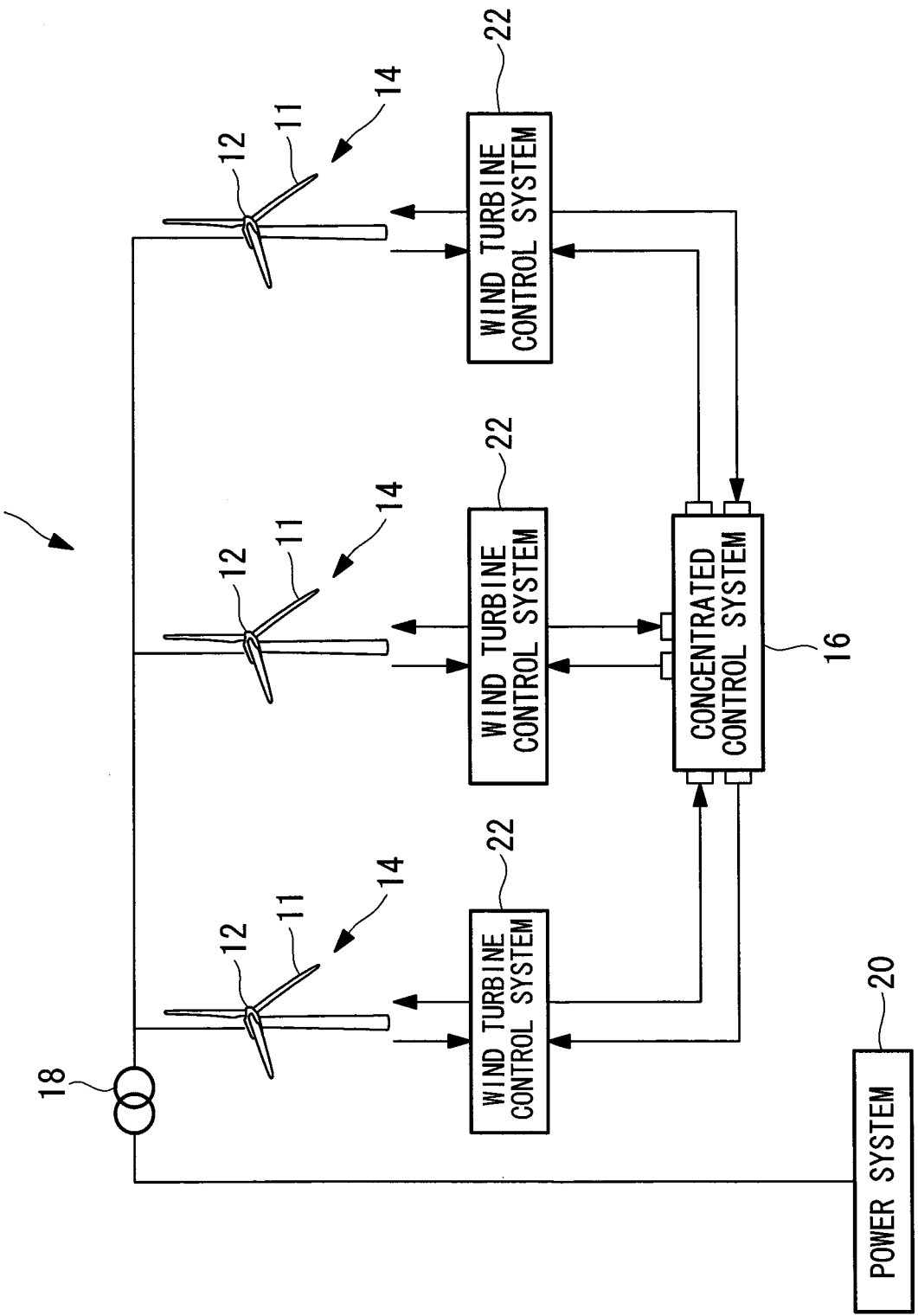
FIG. 1 is a schematic view showing a whole configuration of a wind farm according to an embodiment of the present invention.

FIG. 1 is a view showing a whole configuration of a wind farm 10 according to the embodiment of the present invention. The wind farm 10 includes a plurality of wind power generators 14, each of which generates power by use of a rotation of a rotor 12 having a plurality of blades 11, and a concentrated control system 16 (such as SCADA (Supervisory Control And Data Acquisition)) to entirely control the wind farm 10. In addition, while the wind farm 10 in this embodiment will be described taking an example in which the three wind power generators 14 are provided as shown in FIG. 1, the number thereof is not limited in particular.

The wind power generator 14 according to this embodiment is interconnected to a system through a transformer 18, and can further supply power to a power system 20 in response to a decrease in frequency of the power system 20 (hereinafter, referred to as the "system frequency"), so that the wind power generator 14 can contribute to reduction in fluctuation of the system frequency (frequency response control) within a predetermined time (such as 30 seconds) after disturbance has been generated in the power system 20.

In addition, each of the wind power generators 14 is provided with a wind turbine control system 22.

The wind turbine control system 22 controls an operation state of the corresponding wind power generator 14 and can receive and transmit various kinds of data from and to the concentrated control system 16. Furthermore, the wind turbine control system 22 can detect the fluctuation in power and system frequency of the power system 20 and measure a rotation speed of the rotor 12 (hereinafter, referred to as the "rotor rotation speed") of the wind power generator 14.

Thus, the wind turbine control system 22 transmits data such as data showing a control state of the wind power generator 14, the rotor rotation speed of the wind power generator 14, a wind speed in the vicinity of the wind power generator 14 measured by an anemometer (not shown), and a power generation output of the wind power generator 14, to the concentrated control system 16. On the other hand, the concentrated control system 16 transmits data such as a parameter required to control the wind power generator 14, to the wind turbine control system 22.

Next, a more detailed description will be made of the control for the wind power generator 14 by the wind turbine control system 22.

The wind turbine control system 22 according to this embodiment controls the wind power generator 14 to perform a deload operation in which the power generation output of the wind power generator 14 is previously limited, in order to enable the frequency response control of the wind power generator 14, that is, in order to ensure excess power to increase the power generation output of the wind power generator 14, to be supplied to the power system 20 at the time of the disturbance generation in the power system 20. In addition, the wind power generator 14 according to this embodiment can perform an overload operation (operation to obtain the power generation output more than a rated output) when performed within a predetermined time limit.

Note that methods to limit the power generation output includes a method to directly limit the power generation output from a power generator in the wind power generator 14, and a method to optimize the power generation output by closing a pitch angle of the blade 11 of the rotor 12 to allow wind energy to escape. In the wind power generator 14 according to this embodiment, the deload operation is performed by appropriately using the two above methods.

Thus, the concentrated control system 16 performs a restricted amount setting process by deriving and setting a restricted amount of the power generation output, to make the wind power generator 14 perform the deload operation in the wind farm 10.

Figure 2:
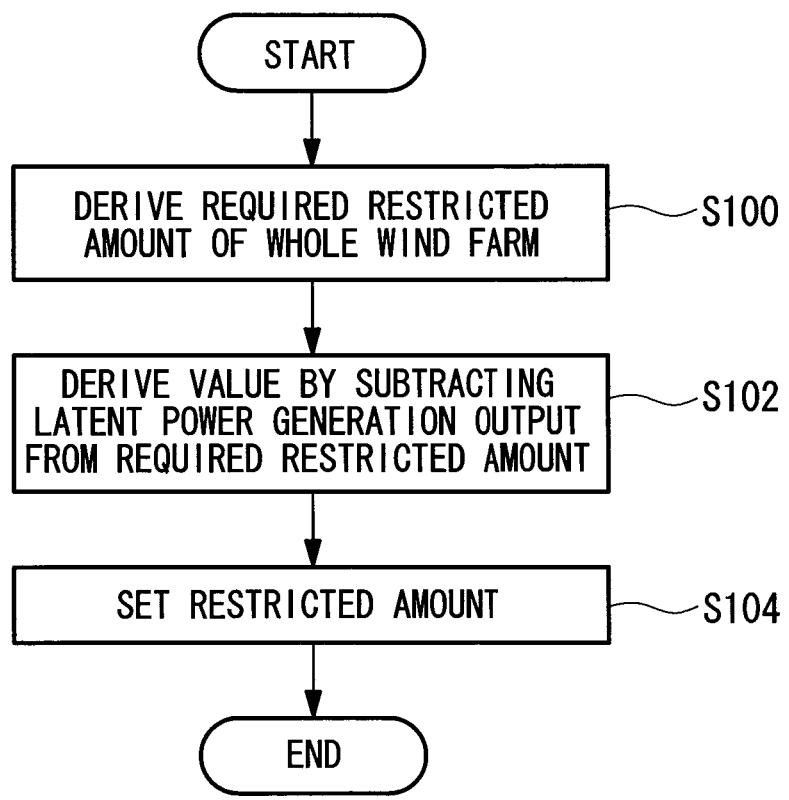
FIG. 2 is a flowchart showing a flow of a process of a restricted amount setting program according to the embodiment of the present invention.

FIG. 2 is a flowchart showing a process flow of a restricted amount setting program executed by the concentrated control system 16 when the restricted amount setting process is performed, and the restricted amount setting program is previously stored in a predetermined region of a memory part (such as magnetic memory device or semiconductor memory device (not shown)) in the concentrated control system 16.

Note that the restricted amount setting process is performed every predetermined time (such as every several seconds to one minute).

First, In step 100, a required restricted amount corresponding to a power generation output required is derived to respond to the decrease in system frequency. More specifically, a whole power generation output of the wind farm 10 is detected, and the whole required restricted amount of the wind farm 10 to ensure the excess power to increase the power generation output to be used for the decrease in system frequency is derived based on the detected power generation output.

Note that, as the required restricted amount, a predetermined fixed value (such as 10%) may be used regardless of whether the whole power generation output of the wind farm 10 is high or low. In this case, the required restricted amount is derived by multiplying the detected power generation output of the wind farm 10 by the fixed value.

In addition, when the whole power generation output of the wind farm 10 is low, a ratio of the required restricted amount to the power generation output may be lowered. In this case, an ability to respond to the decrease in system frequency decreases. Meanwhile, when the whole power generation output of the wind farm 10 is high, the ratio of the required restricted amount to the power generation output may be raised. In this case, the ability to respond to the decrease in system frequency increases.

In addition, the required restricted amount may be increased or decreased in accordance with a power generation output of another power generation facility connected to the power system 20, and a command from a power generation operator who manages the power system 20.

In next step 102, a value is derived by subtracting an amount corresponding to a latent power generation output with which the power generation output can be increased, from the required restricted amount derived in step 100.

Note that the latent power generation output in this embodiment (hereinafter, referred to as the "output increasing excess power") means a power generation output obtained from inertial energy possessed by the rotating rotor 12 of the wind power generator 14, and a power generation output obtained from the overload operation of the wind power generator 14 performed at the rated output.

The rotor 12 stores the high inertial energy as the rotation speed. Thus, the wind power generator 14 can temporarily supply the power generation output higher than the power generation output obtained from the wind energy received by the blade 11 of the rotor 12, to the power system 20, by using (consuming) the inertial energy stored in the rotor 12. Therefore, the inertial energy corresponding to the rotation speed of the rotor 12 (more than a power-producible minimum rotation speed) can be regarded as the output increasing excess power.

Note that, according to this embodiment, the output increasing excess power obtained from the inertial energy of the rotor 12 is estimated based on a difference between the rotation speed of the rotor 12 of the power generation output 14 at the time of executing the process in this step, and the power-producible minimum rotation speed of the rotor 12.

In addition, the rated output of the wind power generator 14 is designed based on the premise of continuous operation in general. Thus, the wind power generator 14 allows the energy obtained by the wind to partially escape by closing the pitch angle of the blade 11 to prevent the power generating output from exceeding the rated output in strong winds and keep the power generation output at the rated output. However, in the wind power generator 14 which can perform the overload operation according to this embodiment, the wind energy allowed to escape to prevent the power generation output from exceeding the rated output can be regarded as the output increasing excess power only for a short time (such as several tens of seconds to several minutes).

In addition, according to this embodiment, the amount of the wind energy to be allowed to escape, that is, the output increasing excess power which can be obtained from the overload operation of the wind power generator 14 operated at the rated output is estimated based on the wind speed applied to each wind power generator 14 at the time of executing the process in this step, and the pitch angle of the blade 11 of the rotor 12 of each wind power generator 14.

Thus, in this step, the value is derived by subtracting the output increasing excess power obtained from the inertial energy possessed by the rotor 12 and the overload operation, from the required restricted amount. That is, the value derived in this step is provided by deducting the output increasing excess power from the required restricted amount. In addition, the output increasing excess power may be either one of the power generation output obtained from the inertial energy and the power generation output obtained from the overload operation.

In next step 104, a restricted amount of the power generation output for the wind power generator 14 is set to perform the deload operation, based on the value derived in step 102.

Note that, according to this embodiment, the value derived in step 102 is preferentially assigned to the wind power generator 14 which does not reach the rated rotation speed. Thus, the wind power generator 14 which does not reach the rated rotation speed (the wind power generator 14 having the low rotation speed) is greatly limited in output compared to its power generation ratio in the wind farm 10. Meanwhile, the wind power generator 14 having the high rotation speed is slightly limited in output compared to its power generation ratio in the wind farm 10. Thus, since the wind power generator 14 which does not reach the rated rotation speed is greatly limited in power generation output, the generation output of the power generator is limited such that the pitch of the blade 11 is not closed to increase the rotation speed of the rotor 12, so that the rated rotation speed can be quickly attained.

On the other hand, the wind power generator 14 which reaches the rated rotation speed is set to be assigned with a remaining restricted amount provided by subtracting the value assigned to the power generation output 14 which does not reach the rated rotation speed, from the required restricted amount. Note that, in a case where the whole required restricted amount of the wind farm 10 cannot be obtained only from the power generation outputs obtained from the inertial energy possessed by the rotor 12 and the overload operation of the wind power generator 14 which reaches the rated rotation speed, the power generation output is limited in the wind power generator 14 which reaches the rated rotation speed.

Figure 3:
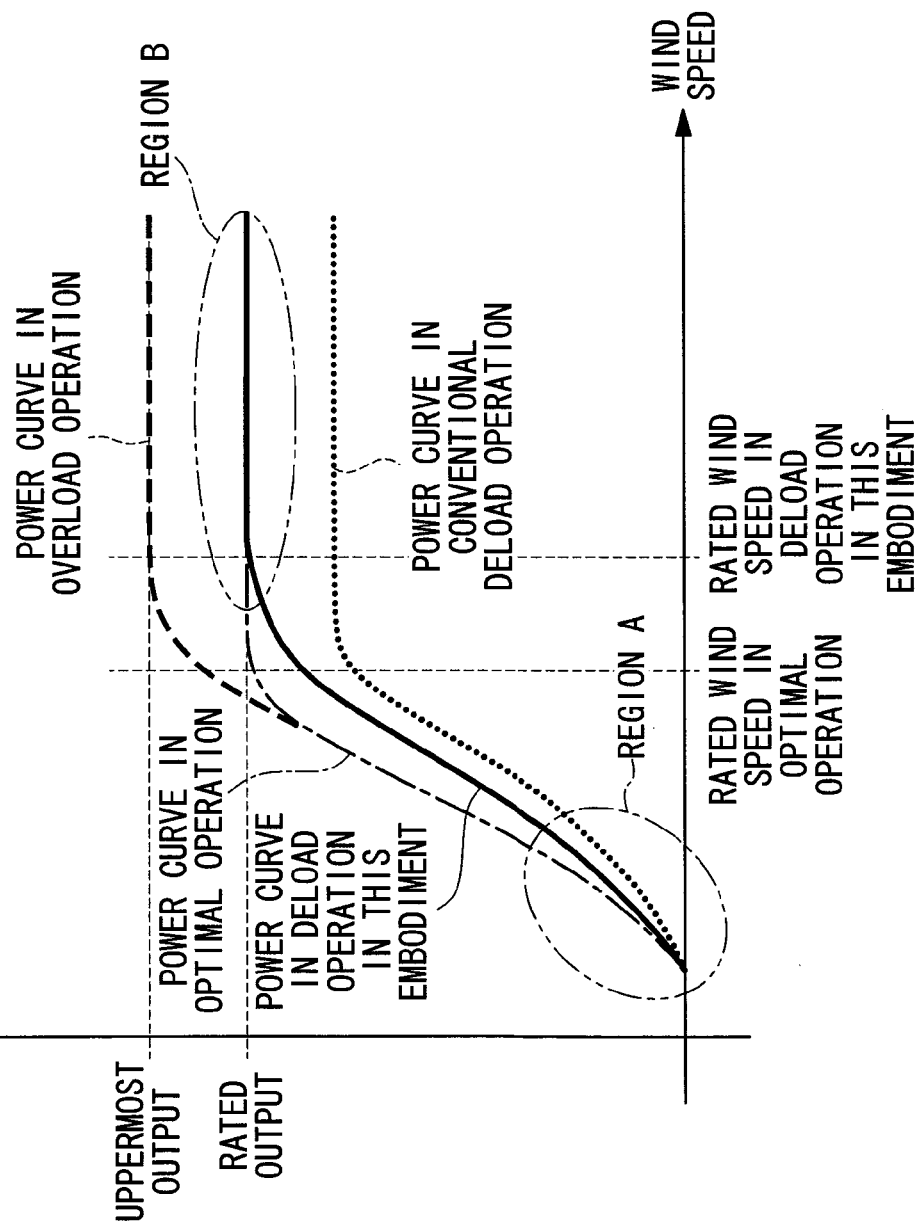
FIG. 3 is a graph showing an example of a relationship between wind speed and a power generation output of a wind power generator when a restricted amount is set according to the embodiment of the present invention.

FIG. 3 is a graph showing one example of a relationship between the wind speed and the power generation output of the wind power generator 14 when the restricted amount according to this embodiment is set. In the drawing, a change in power generation output (hereinafter, referred to as the "power curve") shown by a dotted line shows a case where a conventional deload operation is performed. Note that the conventional deload operation means an operation to generate power while the pitch angle is always limited. A power curve shown by a solid line shows a case where the deload operation according to this embodiment is performed. A power curve shown by one-dot chain line shows a case of an optimal operation in which the deload operation is not performed. A power curve shown by a broken line shows a case where the overload operation is performed. That is, a difference between the power curve in the optimal operation and the power curve in the conventional deload operation, and a difference between the power curve of the optimal operation and the power curve in the deload operation according to this embodiment correspond to the wind energy which is not used for the power generation output, that is, the discarded energy.

When the wind speed is low, and the rotor 12 does not reach the rated rotation seed (in an excess state in a region A in FIG. 3), in the deload operation according to this embodiment, as described in step 104 in the above restricted amount setting process, the output is limited such that the pitch of the blade 11 is not closed until the rotation speed of the rotor 12 becomes high. Thus, when the rotation speed becomes high to some extent, the output increasing excess power can be ensured with the inertial energy, so that the output limit is not needed. In this state, since the wind energy can be all converted to the power generation output, the power curve of the deload operation according to this embodiment before the rotor 12 reaches the rated rotation speed is a little lower than the power curve of the optimal operation, due to the above output limit to increase the rotation speed. After that, when the wind speed increases and the rotor 12 reaches the rated rotation speed, in the example as shown in FIG. 3, the power curve of the deload operation in this embodiment is lowered due to limitation in power generation output as compared with the power curve of the optimal operation. However, since the restricted amount is set such that the power generation output obtained from the inertial energy of the rotor 12 is regarded as the output increasing excess power in the wind power generator 14 according to this embodiment, its power generation output is higher than the power curve of the conventional deload operation.

Thus, in the conventional deload operation, even when the wind speed becomes high and the rotor 12 reaches the rated rotation speed, the rated output cannot be attained because of the output limitation, and its uppermost value is limited to a constant value (a lowered rated output in the conventional deload operation). However, in the deload operation according to this embodiment, the restricted amount is set such that the power generation output obtained from the overload operation is regarded as the output increasing excess power.

Therefore, as shown in a region B in FIG. 3, when the power generation output obtained from the overload operation is sufficient with respect to the required restricted amount, the rated output can be attained in the deload operation in this embodiment, so that the power generation output shown by the power curve of the deload operation in this embodiment is equal to the power curve of the optimal operation, in the region having sufficiently high wind speed.

Figure 4:
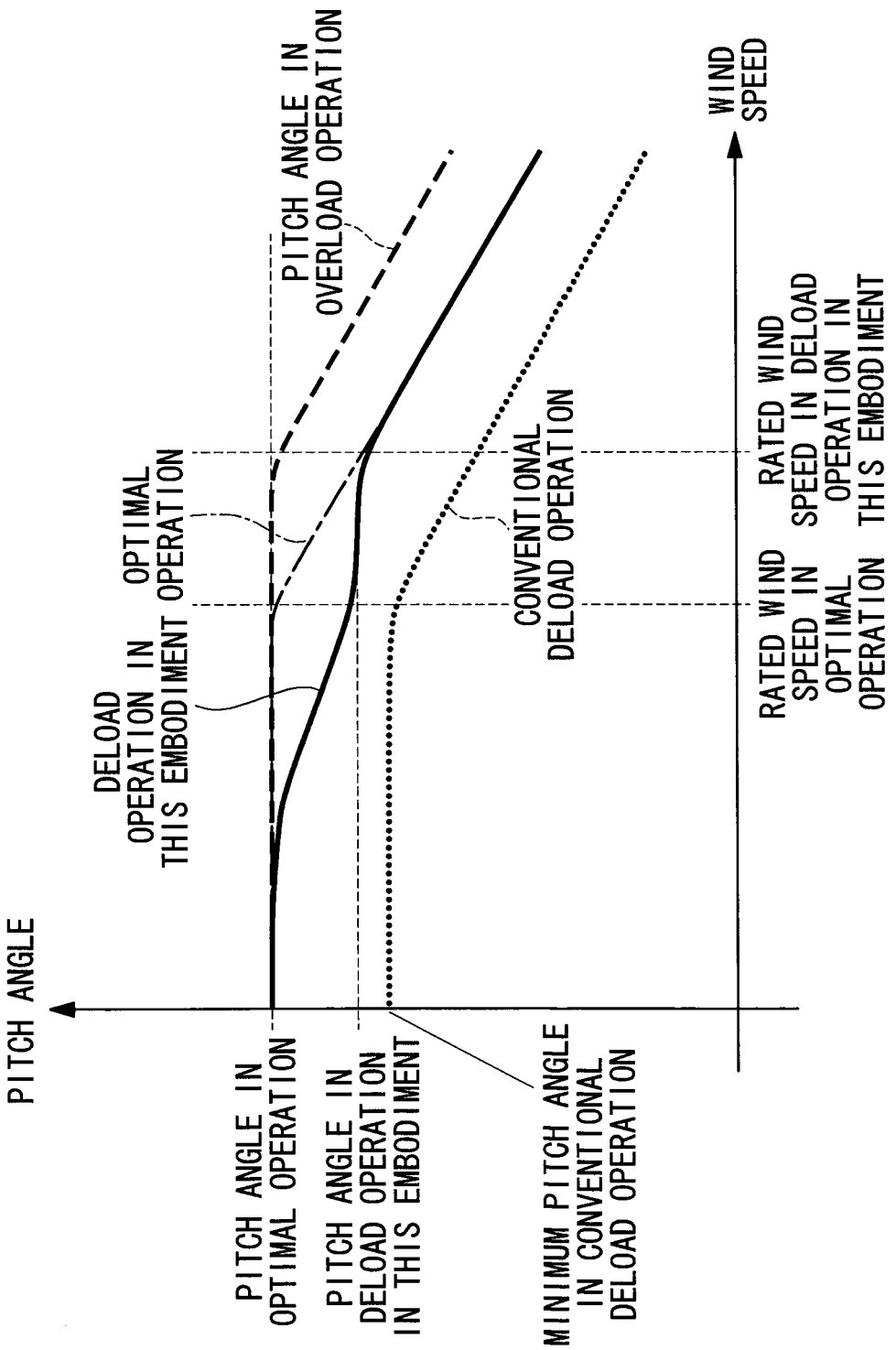
FIG. 4 is a graph showing an example of a relationship between the wind speed and a pitch angle of a blade when the restricted amount is set according to the embodiment of the present invention.

In addition, FIG. 4 is a graph showing one example of a relationship between the wind speed and the pitch angle of the blade 11 when the restricted amount according to this embodiment is set. In this drawing, a change in a pitch angle shown by a dotted line shows the case where the conventional deload operation is performed. A change in a pitch angle shown by a solid line shows the case where the deload operation in this embodiment is performed. A change in a pitch angle shown by a one-dot chain line shows the case of the optimal operation in which the deload operation is not performed. A change in a pitch angle shown by a broken line shows the case where the overload operation is performed.

While the wind speed is low, and the rotor 12 does not reach the rated rotation speed, in the deload operation according to this embodiment, as described in the above, the output is limited such that the pitch angle of the blade 11 is not closed until the rotation speed of the rotor 12 becomes high. Therefore, as shown in FIG. 4, the pitch angle of the deload operation according to this embodiment is the same as the pitch angle of the optimal operation before the rotor 12 reaches the rated rotation speed, so that it is most likely to receive the wind energy in a full fine state. Then, when the wind speed becomes high and the rotor 12 reaches the rated rotation speed, in order to limit the power generation output as described above, the wind energy is allowed to escape by closing the pitch angle in the deload operation in this embodiment to limit the output. However, in the wind power generator 14 according to this embodiment, since the restricted amount is set such that the power generation output obtained from the inertial energy possessed by the rotor 12 is regarded as the output increasing excess power, the pitch angle is set to the fine side so as to receive more wind as compared with the pitch angle of the conventional deload operation. In addition, when the system frequency decreases, the pitch angle which was closed to limit the output is returned to the original position, that is, to the fine side, so that more wind energy can be received, and the inertial energy of the rotor 12 is used as the power generation output.

Thus, when the wind speed reaches more than the rated wind power in the deload operation in this embodiment, in order to set the power generation output obtained from the overload operation as the output increasing excess power, the pitch angle is changed so as to discard the wind, based on the wind speed similar to the optimal operation. Note that, at the time of the overload operation, the pitch angle which was closed to limit the output is returned to its original position, and changed to the fine side so that more wind energy can be received.

Next, with reference to schematic views in FIGS. 5 to 11, a description will be made of the power generation output and the output increasing excess power of the wind power generator 14 in the deload operation according to this embodiment as contrasted with the conventional deload operation. In addition, in FIGS. 5 to 11, when the power generation output of the wind power generator 14 in the deload operation is set to "1", the required output increasing excess power is represented by α (α<1).

Figure 5:
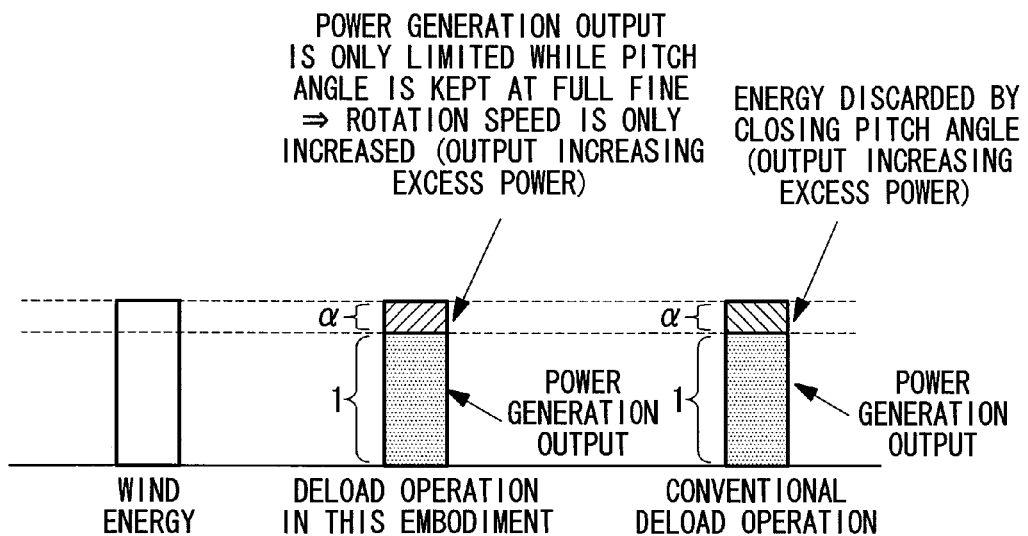
FIG. 5 is a schematic view used to explain the power generation output and the output increasing excess power of the wind power generator when wind energy is small and the rotor can rotate slightly faster than a power producible minimum rotation speed, in the embodiment of the present invention.

FIG. 5 shows a case where wind energy is low (wind speed is low), and the rotor 12 is in the excess state having the rotation speed slightly higher than the power-producible minimum rotation speed. In this case, in the conventional deload operation, the wind energy discarded by closing the pitch angle is regarded as the output increasing excess power. Thus, in the conventional deload operation, when the system frequency decreases, the pitch angle is opened, so that the discarded wind energy is received to increase the power generation output.

Meanwhile, in the deload operation according to this embodiment, while the power generation output is limited to ensure the output increasing excess power, the pitch angle is set to be full fine so that the rotor 12 maximally receive the wind energy. Therefore, the rotation speed of the rotor 12 is increased by the wind energy excessively obtained from the power generation output. Thus, in the deload operation according to this embodiment, when the system frequency decreases, the limitation of the power generation output is cancelled, the power generation output is increased to the power generation output corresponding to the rotation speed of the rotor 12.

Figure 6:
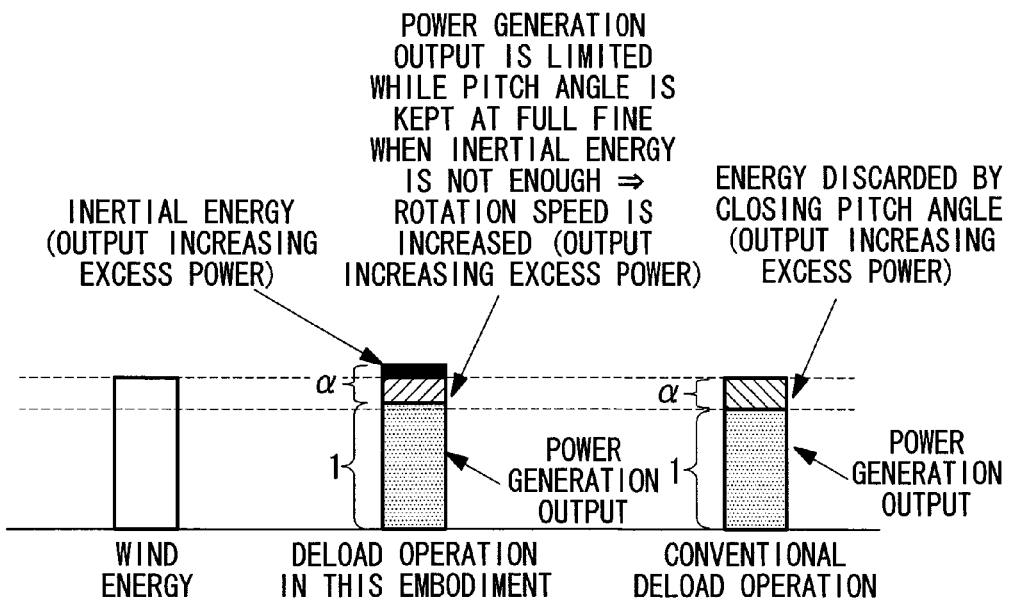
FIG. 6 is a schematic view used to explain the power generation output and the output increasing excess power of the wind power generator when the rotation speed of the rotor increases, in the embodiment of the present invention.

FIG. 6 shows the case of the excess state in which the rotation speed of the rotor 12 is being increased. In this case, in the conventional deload operation, while the pitch angle is closed to obtain the output increasing excess power, a part of the wind energy received by the blade 11 is discarded from this output increasing excess power.

Meanwhile, in the deload operation according to this embodiment, the power generation output obtained from the inertial energy possessed by the rotor 12 is regarded as the output increasing excess power. Thus, in the deload operation according to this embodiment, more power generation output can be obtained than the conventional deload operation. In addition, when the inertial energy of the rotor 12 alone is not enough for the output increasing excess power, the power generation output is only limited while the pitch angle is fixed to full fine, and the limited power generation output is regarded as the output increasing excess power and the rotation speed of the rotor 12 is increased.

Figure 7:
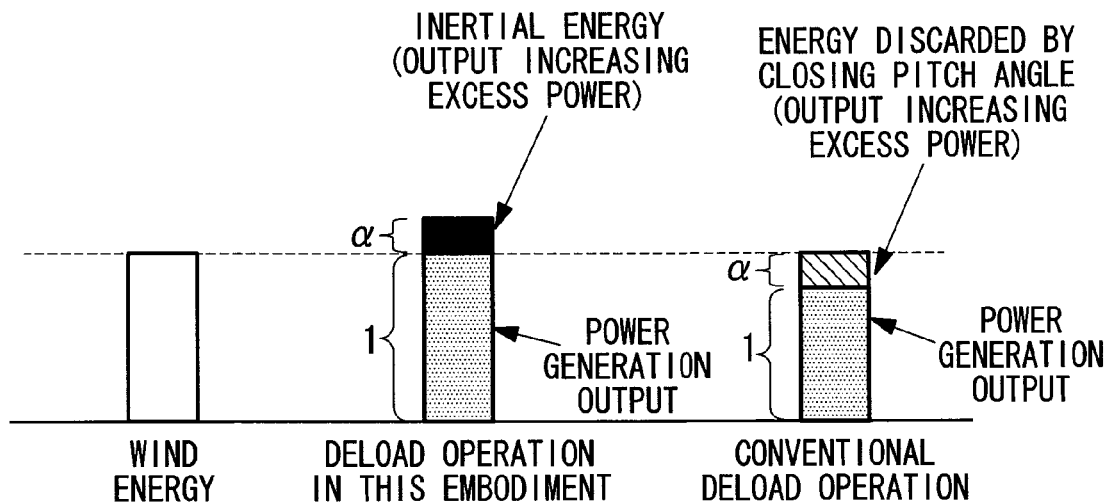
FIG. 7 is a schematic view used to explain the power generation output and the output increasing excess power of the wind power generator when the rotation speed of the rotor becomes constant at low wind speed, in the embodiment of the present invention.

FIG. 7 shows a case where the rotation speed of the rotor 12 sufficiently becomes high and constant at low speed. In this case, in the conventional deload operation, the pitch angle is closed to obtain the output increasing excess power, but a part of the wind energy received by the blade 11 is discarded eventually from this output increasing excess power.

Meanwhile, in the deload operation according to this embodiment, the power generation output obtained from the inertial energy possessed by the rotor 12 is regarded as the output increasing excess power. Thus, in the deload operation according to this embodiment, since the wind energy received by the blade 11 is not discarded, the more power generation output can be obtained as compared with that of the conventional deload operation.

Figure 8:
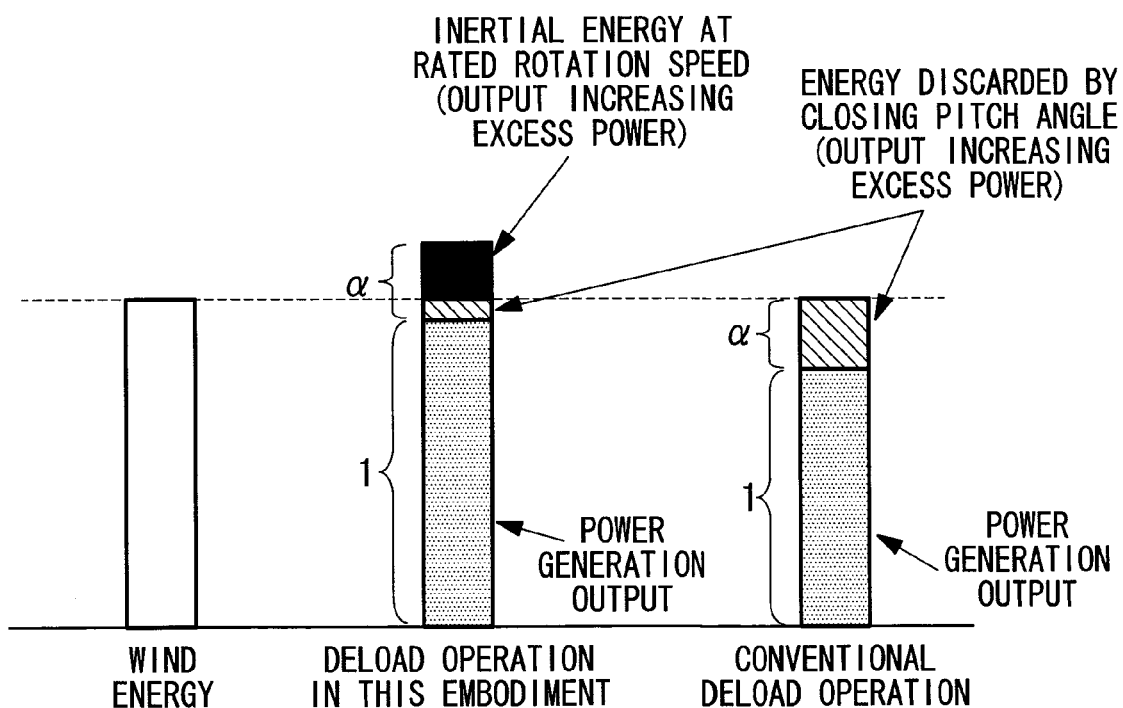
FIG. 8 is a schematic view used to explain the power generation output and the output increasing excess power of the wind power generator when an output is limited by closing the pitch angle of the blade because the rotation speed of the rotor reaches the rated rotation speed, in the embodiment of the present invention.

FIG. 8 shows a case where the output is limited by closing the pitch angle of the blade 11 when the rotation speed of the rotor 12 reaches a maximum rotation speed (rated rotation speed) in the deload operation according to this embodiment. In the deload operation according to this embodiment, the power generation output obtained from the inertial energy possessed by the rotor 12 having the rated rotation speed is regarded as the output increasing excess power.

In the deload operation according to this embodiment, a closed amount of the pitch angle of the blade 11 is smaller and the rotation speed of the rotor 12 is higher than the conventional one. Therefore, in the deload operation according to this embodiment, the rated rotation speed can be obtained even by the wind energy which cannot realize the rated rotation speed in the conventional deload operation in which the output is limited by closing the pitch angle of the blade 11. Note that, also in the deload operation according to this embodiment, the energy discarded by closing the pitch angle is regarded as the output increasing excess power.

Figure 9:
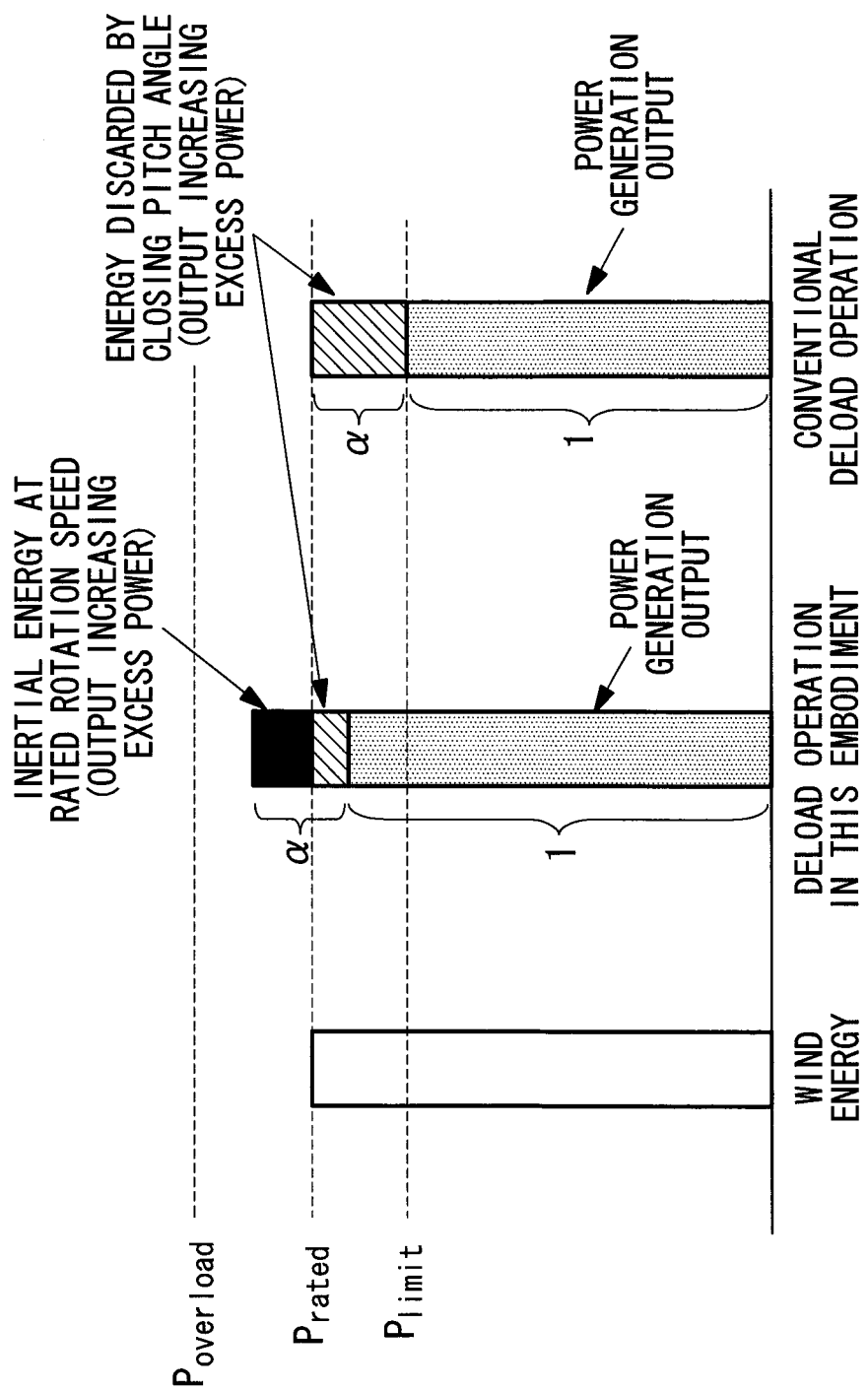
FIG. 9 is a schematic view used to explain the power generation output and the output increasing excess power of the wind power generator when wind energy corresponds to a rated output of the wind power generator, in the embodiment of the present invention.

FIG. 9 shows a case where the wind energy corresponds to a rated output ($P_{rated}$) of the wind power generator 14.

In the deload operation according to this embodiment, since the overload operation can be performed in the wind power generator 14, the power generation output obtained from the inertial energy possessed by the rotor 12 is regarded as the output increasing excess power. Therefore, the output limitation performed by closing the pitch angle of the blade 11 can be small as compared with the conventional deload operation, and the more power generation output can be obtained as compared with the conventional deload operation.

Meanwhile, in the conventional deload operation, the wind power generator 14 is operated at the rated output when the system frequency decreases, so that the operation is performed at a power generation output ($P_{limit}$) provided by limiting the rated output.

Figure 10:
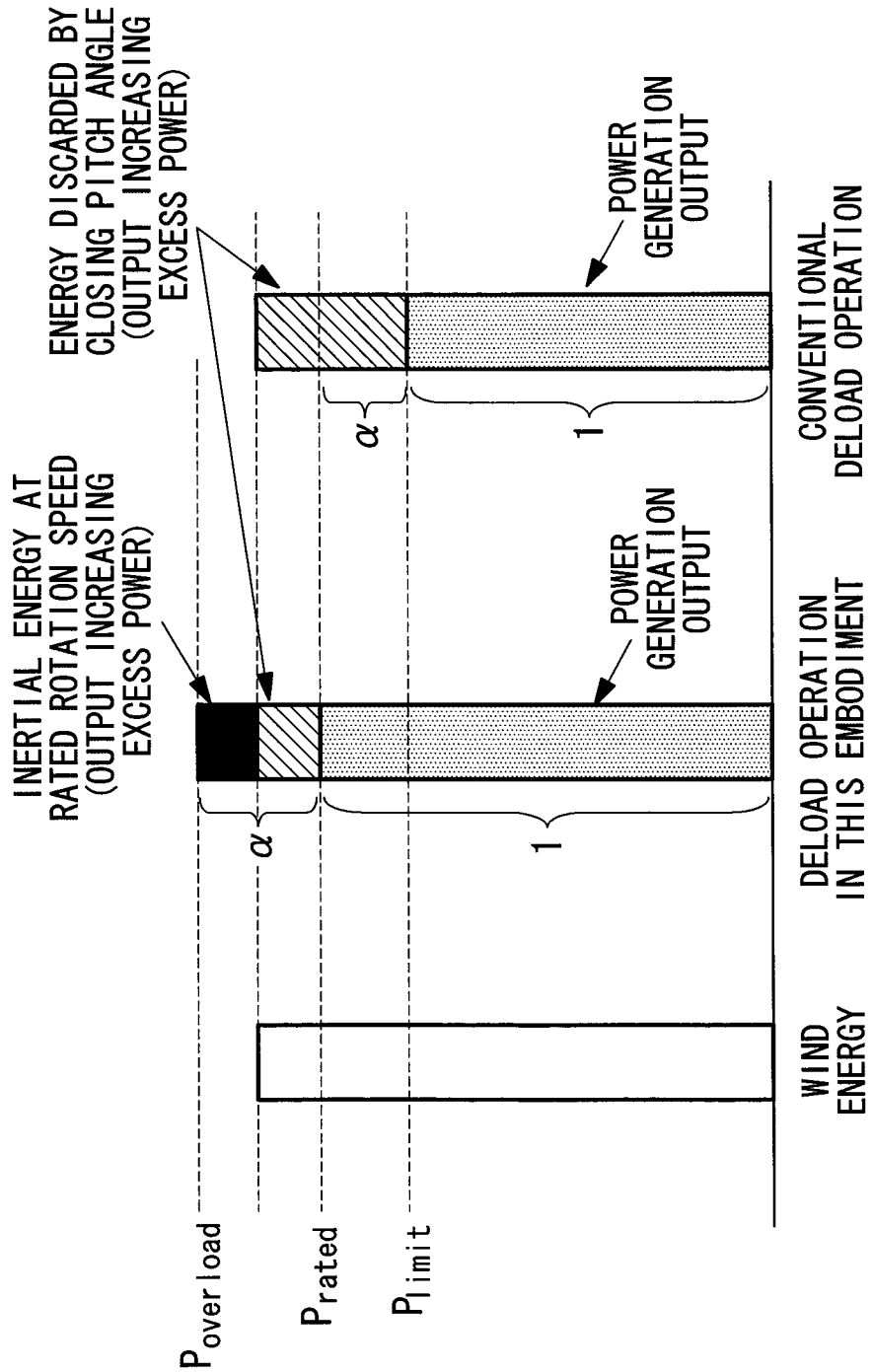
FIG. 10 is a schematic view used to explain the power generation output and the output increasing excess power of the wind power generator when the wind energy can output the power more than the rated output, in the embodiment of the present invention.

FIG. 10 shows a case where the wind energy is high enough to enable the power generation output more than the rated output ($P_{rated}$). In this case also, since the rated output cannot be attained in the conventional deload operation due to the output limitation, the power generation output cannot be increased even when the wind energy is high.

Meanwhile, in the deload operation according to this embodiment, since the overload operation can be performed in the wind power generator 14, the inertial energy of the rotor 12 can be regarded as the output increasing excess power, so that the rated output can be provided by the wind energy which is (1+α) times as low as the rated output. Note that the pitch angle of the blade 11 is closed to prevent the power generation output from exceeding the rated output. Thus, the output increasing excess power can be obtained from the inertial energy possessed by the rotor 12, and the output increasing excess power can be obtained by closing the pitch angle of the blade 11. In addition, the output increasing excess power obtained by closing the pitch angle of the blade 11 serves as the power generation output obtained from the overload operation, which is used when the system frequency decreases.

However, since the overload operation cannot be performed in the conventional deload operation, the wind power generator 14 is operated at the rated output when the system frequency decreases, so that the wind power generator 14 is operated at the power generation output ($P_{limit}$) provided by limiting the rated output.

Figure 11:
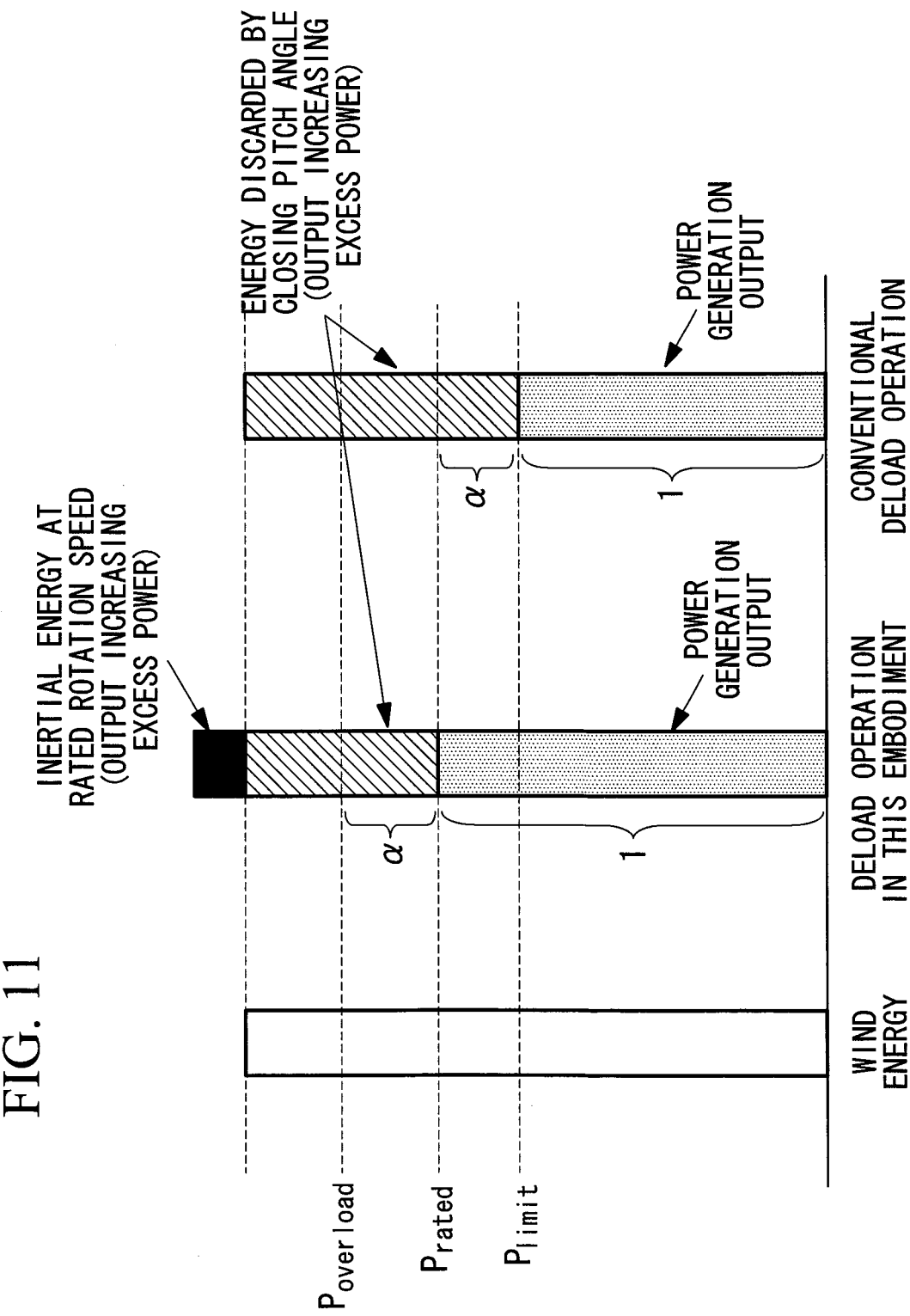
FIG. 11 is a schematic view used to explain the power generation output and the output increasing excess power of the wind power generator when the wind energy can output the power more than a maximum power generation output of an overload operation, in the embodiment of the present invention.

FIG. 11 shows a case where the wind energy becomes higher than the case shown in FIG. 10, and the wind energy is so high that the power generation output can be more than a maximum power generation output of the overload operation. In this case also, in the deload operation according to this embodiment, the pitch angle of the blade 11 is closed to prevent the power generation output from exceeding the rated output, and the output increasing excess power can be obtained from the inertial energy possessed by the rotor 12, and the output increasing excess power can be obtained by closing the pitch angle of the blade 11. In addition, even when the wind energy becomes high as shown in FIG. 11, the overload operation cannot be continuously performed in the wind power generator 14 based on its specification, so that the power generation output is kept at the rated output. The power generation output cannot exceed the rated output unless the overload operation is performed.

Furthermore, the output increasing excess power provided by closing the pitch angle of the blade 11 can be also used to recover the decrease of the rotation speed of the rotor 12. At the time of an output increasing operation in the wind power generator 14 due to the decrease in system frequency, the inertial energy of the rotor 12 is also used, so that the power generation output is controlled to be the maximum power generation output of the overload operation, and the pitch angle is controlled to be on the fine side to keep the rotation speed maximally. At this time, while the inertial energy of the rotor 12 is consumed to output exceeding the wind energy before the pitch angle is completely opened, this is replenished with the wind energy captured more than the power generation output after the pitch angle is completely opened. Thus, since the output increasing operation is performed, the rotor 12 can be prevented from losing the inertial energy and the rotation speed is prevented from being lowered (even when the rotation speed is lowered once, it can be increased to the maximum rotation speed again). Meanwhile, under the wind condition shown in FIGS. 5 to 10, since the wind energy is all converted to the power generation output in the output increasing operation, there is no excess wind energy, so that the rotation speed of the rotor 12 is lowered after the output increasing operation.

Meanwhile, since the overload operation cannot be performed in the conventional deload operation, in order to operate the wind power generator 14 at the rated output when the system frequency decreases, the operation is performed at the power generation output ($P_{limit}$) provided by limiting the rated output by closing the pitch angle of the blade 11.

Next, a description will be made of operation states of the wind power generator 14 according to this embodiment. The operation states include the deload operation, the output increasing operation, and the optimal operation.

In the deload operation, the output is limited as described above. As for the output increasing operation, when the system frequency decreases, power is more supplied to the power system 20 in order to recover the decreased system frequency. In the optimal operation, the output is not limited.

These operation states are transferred when a command value corresponding to the operation state is transmitted from the wind turbine control system 22 to the wind power generator 14. Note that the command value includes a pitch angle command value serving as a command value for the pitch angle of the blade 11, and a power generation output command value serving as a command value for the power generation output.

More specifically, the power generation output command value in the deload operation in a variable speed region (a region before the rotation speed of the rotor 12 reaches the rated rotation speed) and a rated output region (a region in which the rated output is attained) is a command value to limit the power generation output to be prepared to increase the output, and the pitch angle command value in the deload operation in a rated rotation speed region is a command value to limit the pitch angle to be prepared to increase the output. Meanwhile, the pitch angle command value in the variable speed region is fixed to the full fine, the power generation output command vale in the rated rotation speed region is controlled so as to keep the rotation speed at the rated value under PI (proportional-integral) control, and the pitch angle command value in the rated output region is controlled to keep the output at the rated value under the PI control so as to be controlled not for output limitation purpose.

Figure 12:
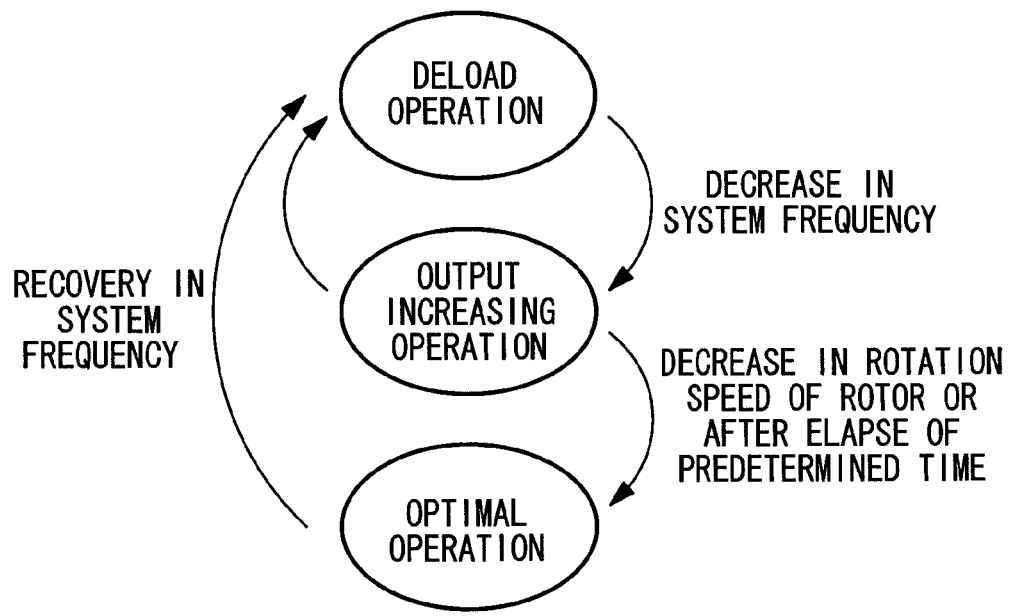
FIG. 12 is a view showing transition of an operation state according to the embodiment of the present invention

Next, a description will be made of a case where the operation state is transferred with reference to FIG. 12.

First, the wind power generator 14 according to this embodiment operated in the deload operation is transferred to the output increasing operation when the wind turbine control system 22 detects a decrease in system frequency.

Thus, when the decreased system frequency is recovered in the output increasing operation mode, the operation state is transferred to the deload operation. Meanwhile, when the rotation speed of the rotor 12 is lowered to the power-producible minimum rotation speed in the output increasing operation mode, or when a predetermined time (such as 30 seconds) has passed since the operation state was transferred to the output increasing operation, the operation state is transferred to the optimal operation. This is because when the rotation speed of the rotor 12 becomes the minimum rotation speed or less, the power generation of the wind power generator 14 is stopped and it takes time to restart the wind power generator 14, or this is to prevent a device defect from being generated because the overload operation is performed over a long time to increase the output, so that the operation state is transferred to the optimal operation in which the power generation output can be easily obtained and the continuous operation can be performed.

In addition, when the decreased system frequency is recovered in the optimal operation, the operation state is transferred to the deload operation.

Figure 13:
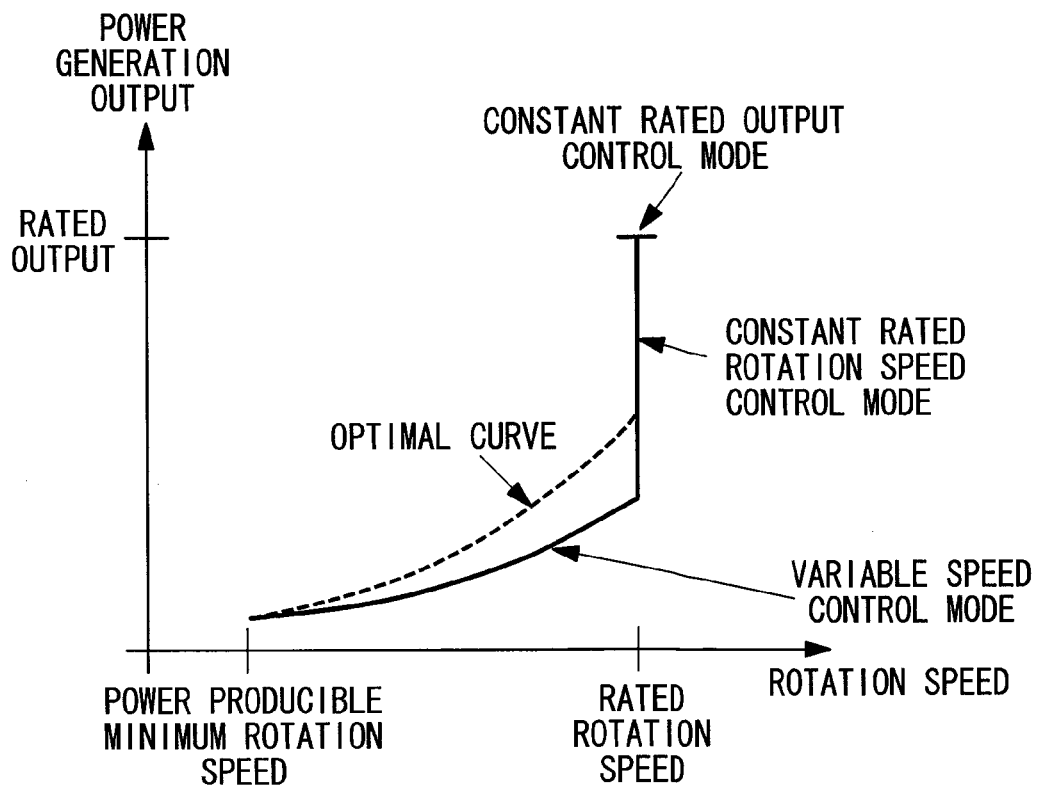
FIG. 13 is a graph showing an example of a relationship between the rotation speed of the rotor and the power generation output in the deload operation according to the embodiment of the present invention.

FIG. 13 is graph showing a relationship between the rotation speed of the rotor 12 and the power generation output of the wind power generator 14 in the deload operation.

As shown in the drawing, the deload operation according to this embodiment is divided into a variable speed control mode, a constant rated rotation speed control mode, and a constant rated output control mode. The variable speed control mode is a control mode performed while the rotation speed of the rotor transfers from the power-producible minimum rotation speed to the rated rotation speed. The constant rated rotation speed control mode is a control mode performed to change the power generation output while keeping the rotation speed of the rotor 12 constant. The constant rated output control mode is a control mode performed to keep the rotation speed of the rotor 12 constant, and to keep the power generation output at the rated output. Note that, in this drawing, a dotted line (optimal curve) shows a relationship between the power generation output and the rotation speed in the case where the deload operation is not performed.

Next, a detailed description is made of the pitch angle command value and the power generation output command value transmitted from the wind turbine control system 22 to the wind power generator 14 while the deload operation according to this embodiment is performed, with reference to the following Table 1. Table 1 shows the pitch angle command value and the power generation output command value transmitted from the wind turbine control system 22 to the wind power generator 14 in each control mode.

TABLE 1

| CONTROL MODE | ROTATION SPEED: $\omega$ | PITCH ANGLE COMMAND VALUE: $\theta_{dem}$ | POWER GENERATION OUTPUT COMMAND VALUE: $P_{dem}$ |
| --- | --- | --- | --- |
| VARIABLE SPEED CONTROL MODE | LESS THAN RATED ROTATION SPEED | FULL FINE | OPTIMAL CURVE − $P_{Lim}(\omega)$ |
| CONSTANT RATED ROTATION SPEED CONTROL MODE | RATED ROTATION SPEED | FULL FINE − $\theta_{Lim}(P)$ | PI CONTROL (MAXIMUM VALUE: $P_{rated}$) (MINIMUM VALUE: OPTIMAL CURVE − $P_{Lim}(\omega_{rated})$) |
| CONSTANT RATED OUTPUT CONTROL MODE | RATED ROTATION SPEED | PI CONTROL (MAXIMUM VALUE: FULL FINE − $\theta_{Lim}(P_{RATED})$) | $P_{rated}$ |

As shown in Table 1, in the variable speed control mode, the pitch angle command value $\theta_{dem}$ commands the full fine. Meanwhile, the power generation output command value $P_{dem}$ commands the power generation output provided by subtracting an output limit $P_{lim}(\omega)$ based on the rotation speed of the rotor 12, from the optimal curve.

Thus, in the constant rated rotation speed control mode, the pitch angle command value $\theta_{dem}$ commands the pitch angle provided by subtracting a pitch angle $\theta_{Lim}(P)$ based on the power generation output from the full fine. Thus, in the constant rated rotation speed control mode, the rotation speed is kept constant, and the output is limited under the control of the pitch angle. Meanwhile, the power generation output command value $P_{dem}$ commands the power generation output between a rated output $P_{rated}$, and the power generation output provided by subtracting a limit amount $P_{lim}(\omega_{rated})$ based on the rated rotation speed, from the power generation output of the optimal curve. Note that, in this case, the PI controlled power generation output command value $P_{dem}$ is transmitted from the wind turbine control system 22 to the wind power generator 14.

Furthermore, in the constant rated output control mode, the power generation output command value $P_{dem}$ commands the rated output $P_{rated}$. Meanwhile, the pitch angle command value $\theta_{dem}$ is PI controlled in such a manner that a value provided by subtracting a pitch angle $\theta_{Lim}(P_{rated})$ from the full fine angle is set to a maximum value.

Next, a description will be made of a case where each control mode is transferred to another control mode.

When the wind speed becomes high and the rotation speed of the rotor 12 reaches the rated value in the variable speed control mode, the control mode is transferred to the constant rated rotation speed control mode. Note that, in the variable speed control mode, the pitch angle of the blade 11 is set to the full fine so as to capture the wind energy at maximum efficiency, and the power generation output is limited to increase the rotation speed of the rotor 12. In addition, in the constant rated rotation speed control mode, in order to keep the rotation speed of the rotor 12 at the rated rotation speed, the power generation output is PI controlled, and the output is limited by closing the pitch angle of the blade 11.

In the constant rated rotation speed control mode, when the wind speed becomes higher and the power generation output reaches the rated output, the control mode is transferred to the constant rated output control mode. In the constant rated output control mode, the output is limited by the pitch angle of the blade 11, the rotation speed of the rotor 12 is controlled to be kept constant, and the power generation output is fixed to the rated value.

In the constant rated output control mode, when the wind speed becomes low and the rated rotation speed cannot be maintained even by the PI-controlled maximum value of the pitch angle, the control mode is transferred to the constant rotation speed control mode.

In the constant rotation speed control mode, when the wind speed becomes lower, and the rated rotation speed cannot be maintained even by the PI-controlled minimum value of the power generation output, the control mode is transferred to the variable speed control mode.

As described above, the concentrated control system 16 according to this embodiment derives the required restricted amount corresponding to the power generation output required to respond to the decrease in system frequency, derives the value by subtracting the amount corresponding to the latent power generation output with which the power generation output can be increased, from the above restricted amount, and sets the restricted amount of the power generation output in each wind power generator 14, based on the above value so as to perform the operation with the power generation output previously limited, to respond to the decrease in system frequency. Thus, even when the wind power generator 14 performs the operation with the power generation output limited, the restricted amount of the power generation output can be small.

As described above, while the present invention has been described based on the above embodiment, the technical scope of the present invention is not limited to the scope described in the above embodiment. Various kinds of modification or improvement can be added to the embodiment without departing from the scope of the invention, and the modified or improved embodiment is included in the technical scope of the present invention.

Further, while the description has been made of the case where the value derived in step 102 is preferentially assigned to the wind power generator 14 which does not reach the rated rotation speed, the present invention is not limited to the above, so that the value derived in step 102 may be divided by the number of the wind power generators 14 of the wind farm 10 and the averaged restricted amount may be set for each wind power generator 14.

Furthermore, as another embodiment, the wind power generator 14 receiving wind having cut-in wind speed (wind speed to start power generation (such as 3 m/s)) or less is not interconnected to a system and the rotor 12 is previously rotated with no load, and when the system frequency decreases, the wind power generator 14 having the power-producible minimum rotation speed or more is interconnected to the system, and the inertial energy possessed by the rotor 12 can be supplied as the power generation output, so that the wind power generator 14 receiving the cut-in wind speed or less can also respond to the decrease in system frequency.

In addition, as another embodiment, when the wind power generator 14 responds to the decrease in system frequency, power to be supplied to the power system 20 can be further increased by cutting the power to be supplied to an auxiliary machine in the wind power generator 14. In this embodiment, the auxiliary machine whose power is cut is to be a component such as a cooling fan or cooling water pump which consumes a relatively high power as compared with another auxiliary machine and whose time constant influenced by its stoppage is long and even when it is stopped, there is no problem.

In addition, in a case where the wind power generator 14 is provided with an electric storage device and its storage battery is being charged, a power generation output used in the charging operation may serve as the output increasing excess power. In addition, the above electric storage device is a secondary battery used for smoothing the power over a long time.

What is claimed is:

1. A wind farm comprising:
   a plurality of wind power generators; and
   a control system of at least one of the plurality of wind power generators, interconnected to a power system to generate power and configured to generate power through a rotation of a rotor, said control system comprising:
   a control unit configured to control the wind power generator to operate at a reduced power generation output when a decrease in a frequency of the power system is not detected,
      wherein the reduced power generation output is set by making a blade pitch angle of the rotor smaller than a maximum power blade pitch angle corresponding to a maximum power output generable by the wind power generator in the wind condition, such that the reduced power generation output is lower than the maximum power output and further power is suppliable by the wind power generator to the power system in response to a decrease in the frequency in the power system;
   a first deriving unit configured to derive a required restricted amount without considering a latent power generation output that the power generation output is increasable with, the required restricted amount being used for deriving the reduced power generation output; and
   a second deriving unit configured to derive a corrected restricted amount by subtracting an amount corresponding to the latent power generation output from the required restricted amount derived by the first deriving unit;
   wherein the control unit is configured to determine the reduced power generation output by reducing the corrected restricted amount derived by the second deriving unit from the maximum power output corresponding to the wind condition, and
   wherein the control unit is configured to set the reduced power generation output so that the corrected restricted amount derived by the second deriving unit is preferentially assigned to one of the plurality of wind power generators which does not reach a rated rotation speed.

2. The wind farm according to claim 1, wherein the latent power generation output includes at least one of a power generation output obtained from inertial energy possessed by the rotating rotor, a power generation output obtained from an overload operation performed at a rated output, and a power generation output used for charging an electric storage device.

3. The wind farm according to claim 1, wherein the control unit is configured to set the derived reduced power generation output in a case where a rotation speed of the rotor does not reach a rated rotation speed.

4. A method of controlling at least one of a plurality of wind power generators, interconnected to a power system to generate power and configured to generate power through a rotation of a rotor, said method comprising:

controlling the wind power generator to operate at a reduced power generation output when a decrease in a frequency of the power system is not detected, setting the reduced power generation output by making a blade pitch angle of the rotor smaller than a maximum power blade pitch angle corresponding to a maximum power output generable by the wind power generator in the wind condition, such that the reduced power generation output is lower than the maximum power output and further power is suppliable by the wind power generator to the power system in response to a decrease in the frequency in the power system;

deriving a required restricted amount without considering a latent power generation output that the power generation output is increasable with, the required restricted amount being used for deriving the reduced power generation output;

deriving a corrected restricted amount by subtracting an amount corresponding to the latent power generation output from the derived required restricted amount; and determining the reduced power generation output by reducing the derived corrected restricted amount from the maximum power output corresponding to the wind condition, wherein the reduced power generation output is set so that the corrected restricted amount is preferentially assigned to one of the plurality of wind power generators which does not reach a rated rotation speed.

* * * * *